United States Patent Office 3,306,900
Patented Feb. 28, 1967

3,306,900
METHOD FOR PRODUCING 4,6-DIHYDROXY-PYRIMIDINE
Yasuo Fujimoto, Machida-shi, Japan, assignor to Kyowa Hakko Kogyo Co., Ltd., Chiyoda-ku, Tokyo, Japan, a corporation of Japan
No Drawing. Filed Feb. 17, 1965, Ser. No. 433,477
Claims priority, application Japan, Feb. 21, 1964, 39/9,044; Feb. 22, 1964, 39/9,137
13 Claims. (Cl. 260—251)

As is well known, 4,6-dihydroxypyrimidine is a valuable starting material for the synthesis of materials related to nucleic acid.

This invention relates to an economical and commercially feasible method for the production of the said 4,6-dihydroxypyrimidine (directly as the alkali metal salt thereof and ultimately as the base itself) from lower dialkyl malonate, said process being characterized inter alia in that no expensive reagents such e.g. as previously employed formamidine or the like are required and that intermediately formed amidation product need not be isolated. Effectively, therefore, the process is carried out in a single through-put. Economies effected by elimination of costly reagents, elimination of necessity for isolating intermediate amidation product, and the unusually high yield of objective product achieved contribute to the commercial feasibility of the method of the invention. Use of essentially anhydrous conditions also contributes to the economy of the process and purity of the product.

More particularly, the invention is concerned with method for producing 4,6-dihydroxypyrimidine (as the alkali metal salt thereof and eventually as the base itself) by the amidation of di(lower)alkyl malonate with at least one member selected from the group consisting of ammonia and formamide, followed by a pyrimidine ring closing reaction with formamide, both reaction stages being carried out in one through-put in the presence of a member selected from the group consisting of alkali metal and alkali metal alkoxide, the molar sum of the ammonia and formamide being about 3 moles per mole of the malonate and at least one of said 3 moles being formamide.

As is evident from the foregoing, the object of the instant invention is the embodiment of a single through-put procedure for the economical production of 4,6-dihydroxypyrimidine of high purity and with a high production yield.

This object is realized, in one aspect of this invention, by a procedure according to which the 4,6-dihydroxypyrimidine is produced by dissolving alkali metal or alkali metal (lower)alkoxide in a suitable solvent, dissolving gaseous ammonia in the thus-prepared solution at a relatively low temperature, admixing the resultant ammonia-dissolved solution with a di-(lower)alkyl malonate solution, for example by stirring the latter dropwise into the former in the reactor in which it was prepared, tightly closing the reactor and allowing the ensuing amidation reaction to proceed to completion at a suitable temperature with occasional stirring of the reaction mixture, eliminating excess ammonia if any remains after completion of the said reaction (but this elimination of ammonia is not always necessary), adding formamide (at least about 1 mole per mole of malonate used) to the resultant reaction mixture to function as ring-closing agent in addition to alkali metal (lower)alkoxide to function as catalyst for the ring-closing reaction, heating the resultant reaction mixture whereby ring closure to form the pyrimidine ring takes place, and separating the thus-produced alkali metal salt of 4,6-dihydroxypyrimidine, dissolving this salt in water and liberating the free base (4,6-dihydroxypyrimidine) from said aqueous solution by the addition of organic acid or dilute mineral acid, e.g. acetic acid and hydrochloric acid.

The order of various additions is optional. Thus, the ammonia-dissolution may follow rather than precede the addition of the di(lower)alkyl malonate solution; also the addition of formamide may follow rather than precede the addition of alkali metal or alkali metal alkoxide.

The same aforesaid object is achieved according to a second or alternative aspect of the invention according to which alkali metal or alkali metal (lower)alkoxide is dissolved in a suitable solvent in the reactor, stirring the aforesaid malonate solution into the resultant solution, adding a relatively large amount of formamide (more than one mole per mole of malonate)—if desired, this addition of formamide may precede rather than follow the addition of the malonate solution, then upon completion of the ensuing amidation reaction heating the solution to effect ring closure, the excess formamide (at least about 1 mole) functioning as ring-closing agent. Then, as in the procedure according to the first aspect of the invention, the resultant alkali metal salt of 4,6-dihydroxypyrimidine crystals are separated, dissolved in water, and the free base (4,6-dihydroxypyrimidine) liberated by the addition of organic acid or dilute mineral acid.

As for alkali metal or alkali metal alkoxide useful in the present invention an alkali metal such as lithium, sodium or potassium or an alkaxide of these metals such as methoxide, ethoxide, propoxide, butoxide or the like is suitable. When an alkali metal alkoxide is used, it is possible to dissolve alkali metal in an alcohol such as methanol, ethanol, propanol, butanol or the like, which is to be used as reaction medium thereby to form alkoxide in situ, instead of adding preformed alkali metal alkoxide.

The reaction medium can be constituted by alcohols such as methanol, ethanol, propanol (any isomer), butanol (any isomer), pentanol (any isomer), hexanol (any isomer), cyclohexanol, ethylene glycol, propylene glycol, hexylene glycol, glycerol, benzyl alcohol and the like; ethers such as propyl ether (any isomer), butyl ether (any isomer), amyl ether (any isomer) dioxane (any isomer), benzyl ether, anisol, furane, tetrahydrofurane and the like; ethylene glycol dialkylethers; propylene glycol dialkylethers; polyethylene glycol dialkyl ethers such as diethylene glycol dialkylethers; polypropylene glycol dialkylethers such as dipropylene glycol dialkylethers; alcohol ethers such as ethylene glycol monoalkyl ethers, polyethylene glycol monoalkyl ethers (e.g. diethylene glycol monoalkyl ethers, propylene glycol monoalkyl ethers, polypropylene glycol monoalkyl ethers (e.g. dipropylene glycol monoalkyl ethers); polyethylene glycols (e.g. diethylene glycol); polypropylene glycols (e.g. dipropylene glycol); furfuryl alcohol; tetrahydrofurfuryl alcohol; formamide; esters of formic acid and the like.

As for the reaction temperature, there is no limitation for the first step reaction using ammonia. This is preferably carried out at relatively low temperature (e.g. about 0° C.) up to ambient temperature (about 15° to about 35° C.). However, a temperature higher than 50° C. is preferred for the second step (ring-closure) reaction or when using formamide along as additive, in which case the upper limit may be as high as the boiling point of the mixture.

A more comprehensive understanding of the invention can be obtained by referring to the following illustrative examples of presently-preferred embodiments; these examples are not intended, however, to be limitative of the invention. In these examples, parts by weight bear the same relation to parts by volume as do grams to milliliters.

*Example 1*

0.2 part by weight of sodium is dissolved in 200 parts by volume of ethanol. Gaseous ammonia is saturated therein at 0° C. After adding 16 parts by weight of diethyl malonate dropwise and then tightly closing the reactor, the reaction (amidation) is allowed to proceed at room temperature (25°–35° C.) for 48 hours while stirring. Then excess ammonia is eliminated by evacuating the reactor at a reduced pressure at a temperature of about 30° to 40° C., and ethanol solution of sodium (prepared by dissolving 6.7 parts by weight of sodium in 120 parts by volume of ethanol) is added to the reactor.

After stirring for a while, 6.5 parts by volume of formamide are added and the mixture is heated to boiling. After allowing the ensuing ring-closing reaction to proceed under reflux for 2 hours, the reaction mixture is cooled over-night. The thus-precipitated white crystals are dissolved in 70 parts by volume of water and then the pH of the solution is adjusted to 3 to 4 with 60 parts by volume of 5-normal hydrochloric acid solution, 4,6-dihydroxypyrimidine in an amount of 8.4 parts by weight are obtained by cooling the solution with ice, subjecting it to suction-filtration, and then to drying in vacuo.

*Example 2*

20.4 parts by weight of sodium ethoxide are dissolved in a mixed solvent consisting of 200 parts by volume of 2-ethoxy-ethanol and 8 parts by volume of formamide. After saturating the resulting solution with gaseous ammonia at 0° C. and dropping in 16 parts by weight of diethyl malonate, the reactor is closed and maintained at room temperature as in Example 1 for 48 hours while stirring. Then the temperature of the reactor is raised to 90°–100° C. and this temperature is maintained for 2 hours under stirring. The reaction mixture is then cooled to room temperature and allowed to stand overnight. By the same further procedure as in Example 1. 8.6 parts by weight of 4,6-dihydroxypyrimidine are obtained.

*Example 3*

16 parts by weight of diethyl malonate are added dropwise into an ethanol solution of sodium ethoxide prepared by dissolving 6.9 parts by weight of sodium in 120 parts by volume of ethanol under stirring. After the stirring has continued for some time, sodium salt of malonic acid begins to precipitate and further continuation of stirring becomes difficult. 34.9 parts by weight of formamide are added to the solution and the mixture is heated to boiling, while driving off ethyl formate formed during the reaction. The reaction mixture is then allowed to stand at room temperature overnight. After the precipitated white crystals are dissolved in 75 parts by volume of water and the pH of the solution adjusted to 3 to 5 by the addition of 5-normal hydrochloric acid. After cooling the solution with ice, suction-filtering the precipitated crystals, washing with water one time and drying in vacuo, 10.1 parts by weight of 4,6-dihydroxypyrimidine are obtained.

*Example 4*

25.2 parts by weight of potassium ethoxide are dissolved in a mixed solvent consisting of 200 parts by volume of ethylene glycol diethyl ether and 40 parts by volume of formamide under stirring. After the dropwise addition of 13.2 parts of dimethyl malonate, the mixture is heated and reaction allowed to take place at 100° to 120° C. for 3 to 5 hours, after which the mixture is allowed to stand overnight at room temperature. By following the same further procedure as in Example 1, 9.6 parts by weight of 4,6-dihydroxypyrimidine are obtained.

What is claimed is:

1. In the production of 4,6-dihydroxypyrimidine, the steps of admixing amidating agent selected from the group consisting of ammonia and formamide with di(lower)alkyl malonate in a reaction medium containing a catalyst selected from the group consisting of alkali metal and alkali metal (lower)alkoxide and allowing the ensuing amidation reaction to proceed until completion of the formation of malonic acid diamide, adding formamide up to a total amount of about one mole of unreacted formamide to function as ring-closing agent, and heating the thus-formed reaction mixture to a temperature above about 50° C. to effect pyrimidine ring-closure, said amidation and pyrimidine ring formation being effected successively and without isolation of intermediately formed amidation product, whereby a high yield of 4,6-dihydroxypyrimidine product is obtained in a one-stage single through-put process, the molar sum of ammonia and total formamide per mole of malonate being about three moles or more, of which at least one is formamide.

2. In the production of 4,6-dihydroxypyrimidine, the steps of admixing ammonia with di(lower)alkyl malonate in a reaction medium containing a catalyst selected from the group consisting of alkali metal and alkali metal (lower)alkoxide and allowing the ensuing amidation reaction to proceed until completion of the formation of malonic acid diamide, adding formamide as ring-closing agent, and heating the thus-formed reaction mixture to a temperature above about 50° C. to effect pyrimidine ring-closure, said amidation and pyrimidine ring formation being effected successively and without isolation of intermediately formed amidation product, whereby a high yield of 4,6-dihydroxypyrimidine product is obtained in a one-stage single through-put process, the molar sum of ammonia and formamide per mole of malonate being about three moles or more, of which at least one is formamide.

3. In the production of 4,6-dihydroxypyrimidine, the steps of admixing formamide with di(lower)alkyl malonate in a reaction medium containing a catalyst selected from the group consisting of alkali metal and alkali metal (lower)alkoxide, and then heating the resulting reaction mixture to a temperature above about 50° C. to effect amidation and pyrimidine ring-closure, said amidation and pyrimidine ring formation taking place successively and without isolation of intermediately formed amidation product, whereby a high yield of 4,6-dihydroxypyrimidine product is obtained in a one-stage single through-put process, the proportion of formamide being at least one mole per mole of malonate.

4. A process according to claim 1, wherein the di(lower)alkyl malonate is diethyl malonate and the alkali metal (lower)alkoxide is sodium ethoxide.

5. A process according to claim 2, wherein the di(lower)alkyl malonate is diethyl malonate and the alkali metal (lower)alkoxide is sodium ethoxide.

6. A process according to claim 3, wherein the di(lower)alkyl malonate is diethyl malonate and the alkali metal (lower)alkoxide is sodium ethoxide.

7. A process according to claim 3, wherein the di(lower) alkyl malonate is dimethyl malonate and the alkali metal (lower)alkoxide is potassium ethoxide.

8. A process according to claim 1, wherein the reaction medium contains substantially anhydrous ethanol and the alkoxide is ethoxide and is formed in situ in said medium.

9. A process according to claim 2, wherein the reaction medium contains substantially anhydrous ethanol and the alkoxide is ethoxide and is formed in situ in said medium.

10. A process according to claim 3, wherein the reaction medium contains substantially anhydrous ethanol and the alkoxide is ethoxide and is formed in situ in said medium.

11. A process according to claim 1, wherein the alkoxide is preformed alkali metal ethoxide.

12. A process according to claim 2, wherein the alkoxide is preformed alkali metal ethoxide.

13. A process according to claim 3, wherein the alkoxide is preformed alkali metal ethoxide.

No references cited.

NICHOLAS S. RIZZO, *Primary Examiner.*